(12) United States Patent
Mullane

(10) Patent No.: US 7,784,214 B2
(45) Date of Patent: Aug. 31, 2010

(54) METHOD AND DEVICE FOR SELECTIVELY POSITIONING A FISHING REEL UPON A ROD

(76) Inventor: Thomas Mullane, P.O. Box 21456, Fort Lauderdale, FL (US) 33335

( * ) Notice: Subject to any disclaimer, the term of this patent is extended or adjusted under 35 U.S.C. 154(b) by 0 days.

(21) Appl. No.: 12/425,313

(22) Filed: Apr. 16, 2009

(65) Prior Publication Data
US 2009/0255167 A1 Oct. 15, 2009

Related U.S. Application Data

(63) Continuation of application No. 11/625,697, filed on Jan. 22, 2007, now abandoned.

(51) Int. Cl.
*A01K 87/06* (2006.01)
(52) U.S. Cl. ............................................. 43/22; 43/23
(58) Field of Classification Search ............... 43/22, 43/23, 18.1 R
See application file for complete search history.

(56) References Cited

U.S. PATENT DOCUMENTS

| | | | |
|---|---|---|---|
| 797,637 A | 8/1905 | Terry | |
| 819,500 A | 5/1906 | Bearse | |
| 828,557 A | 8/1906 | Levison | |
| 1,013,333 A | 1/1912 | Tredwell | |
| 2,018,923 A * | 10/1935 | Potter | 43/23 |
| 2,069,977 A | 2/1937 | Spencer | |
| 2,656,639 A | 10/1953 | Phillipson | |
| 2,753,646 A | 7/1956 | Colmery | |
| 2,780,883 A | 2/1957 | Macy | |
| 2,837,858 A | 6/1958 | Benson | |
| 3,073,055 A | 1/1963 | Edwards et al | |
| 3,310,904 A | 3/1967 | Binvignat | |
| 3,410,016 A | 11/1968 | Arsenault | |
| 3,512,293 A | 5/1970 | Lumbard | |
| 3,732,644 A | 5/1973 | Kavanagh | |
| 3,975,855 A | 8/1976 | McKeown | |
| 4,467,548 A * | 8/1984 | Tabor | 43/23 |
| 4,578,890 A * | 4/1986 | Childre | 43/20 |
| 4,702,032 A * | 10/1987 | Ohmura | 43/22 |
| 4,756,114 A * | 7/1988 | Ohmura | 43/22 |
| 4,821,447 A | 4/1989 | Nakayama et al. | |
| 5,522,169 A | 6/1996 | Heller | |
| 5,890,313 A * | 4/1999 | Collins | 43/20 |
| 6,397,511 B1 | 6/2002 | Atnip | |
| 2003/0233780 A1* | 12/2003 | Grieco | 43/22 |
| 2005/0034351 A1* | 2/2005 | Borgeat | 43/22 |
| 2007/0124983 A1* | 6/2007 | Leyden et al. | 43/22 |

* cited by examiner

*Primary Examiner*—Christopher P Ellis
(74) *Attorney, Agent, or Firm*—McHale & Slavin, P.A.

(57) ABSTRACT

This invention is directed toward a reel seat kit and method of use which allows a particular rod to be modified to accept a plurality of reels, and wherein reproducible and predictable rod action may be achieved via judicious placement of a particular reel in relationship to the rod.

5 Claims, 1 Drawing Sheet

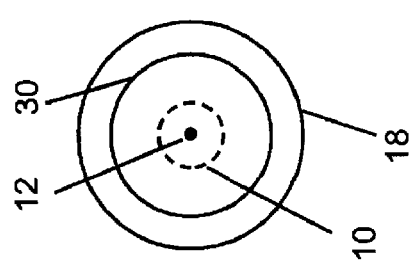
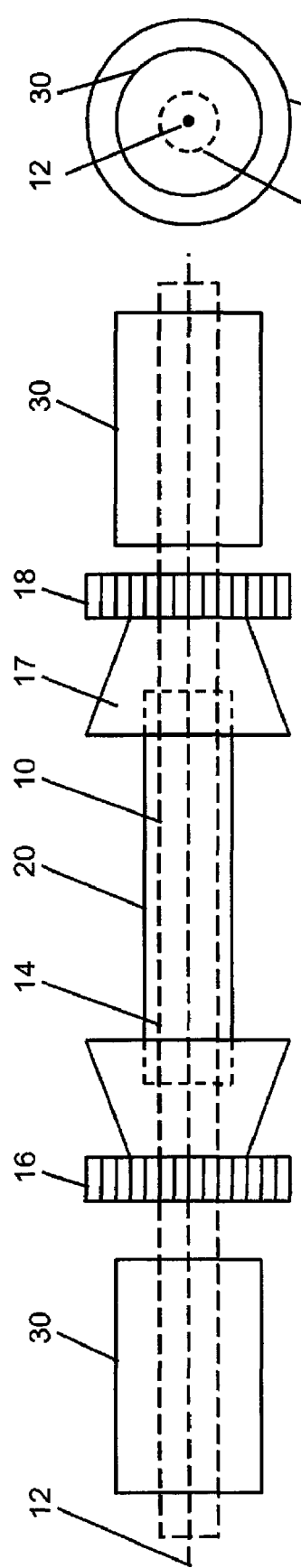
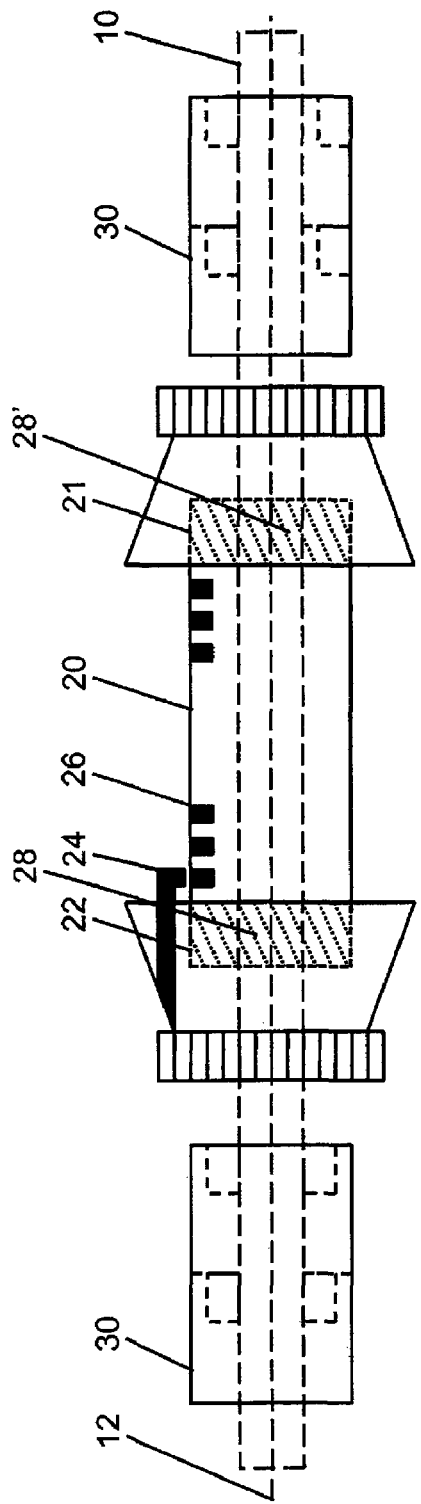

METHOD AND DEVICE FOR SELECTIVELY POSITIONING A FISHING REEL UPON A ROD

This application is a continuation of application Ser. No. 11/625,697 filed Jan. 22, 2007, now abandoned the contents of each of which are herein incorporated by reference.

FIELD OF THE INVENTION

This invention relates to fishing rod and reel combinations, particularly to modifications to a reel seat to enable mating of a plurality of reel types in a plurality of user selectable positions upon a particular rod, and most particularly to a kit for coupling with a particular rod blank to provide an ability to customize the attachment and positioning of a varying selection of reels thereto in order to obtain an optimized combination of rod and reel having the desired action.

BACKGROUND OF THE INVENTION

Numerous types of fishing rods are known, including fly fishing rods, bait casting rods, spin casting rods, spinning rods, ultra-light rods, surf fishing rods and the like. Dating back to various ancient civilizations in Egypt, China, Greece and Rome, fishing rods were originally formed from bamboo, Calcutta reed and ash wood. Rod butts were often formed of materials such as maple, having a bored bottom, and had handles and grips of materials such as cork, wood and cane. Rod guides of wire loops sometimes with ring-shaped inserts were provided.

These materials gradually gave way to synthetic materials such as fiberglass and graphite composites and included joints or ferrules which made it practical to travel with rods that could be broken down until ready for use. Today, modern multi-piece travel rods can be easily transported in a suitcase or backpack. Rod design generally dictates that rods have a gradual taper from butt to tip, requires that the rods must be tight in all of their joints, and have a smooth and progressive taper lacking any "dead spots".

While modern manufacturing techniques enable rod makers to fashion rods having shapes and actions to provide greater casting distance, accuracy, and fish-fighting abilities, the weight and action of a particular rod are normally engineered with a particular end-use in mind, and a particularly preferred reel type and reel mounting position, in order to take maximum advantage of the abilities of a finely tuned rod design.

In order to fish for a multiple species, which requires employing a variety of techniques, it is often necessary for an angler to bring along multiple sets of tackle, each requiring a different combination of rod and reel, and each combination having unique positioning and mounting criteria for the rod and reel combination.

What is lacking in the art is a reel seat for a fishing rod useful for attachment of multiple fishing reel types in a plurality of locations along the rod, so as to produce a number of rod/reel combinations particularly suited to a certain type or style of fishing technique.

Therefore, providing a rod and reel system wherein a particular rod action could be tailored for optimum weight and balance with a plurality of reel types, would satisfy along-felt need in the art.

DESCRIPTION OF THE PRIOR ART

Levison, U.S. Pat. No. 828,557, discloses an improvement in fishing-rods in which one handle is adapted for use in connection with a fly-rod or a bait-rod, the fly rod or the bait-rod being capable of adjustment to two different lengths to suit different requirements.

Bearse, U.S. Pat. No. 819,500, discloses improvements in fishing-rods, and particularly to the manner of mounting the reel thereon; the aim of the invention being to provide means whereby the position of the reel upon the rod may be readily changed to adapt the latter to use as a bait or trolling rod or for fly-casting, as desired.

Terry, U.S. Pat. No. 797,637, discloses an improvement in the means for securing reels upon fishing rods.

Tredwell, U.S. Pat. No. 1,013,333, discloses improvements in fishing rods, particularly applicable to telescopic metal rods in which the handle is separable from the body of the rod, the object of the invention being to provide a reversible handle of improved construction with which the position of the reel with relation to the handpiece may be changed to suit the convenience of the user, or the character of the work being done; whereby by reversing the handle, the reel may be positioned either above or below the hand-piece.

Spencer, U.S. Pat. No. 2,069,977, discloses providing a means for locking a fishing reel to a fishing pole which means will not interfere with the casting facilities of the pole and one that will not interfere with the free use of the fishing pole.

Phillipson, U.S. Pat. No. 2,656,639, discloses a generally tubular reel seat member mountable on a fishing rod either behind or in advance of the rod handle portion, which is characterized by an exterior surface area which is coactable with reel bases of varying size and lateral curvature.

Benson, U.S. Pat. No. 2,837,858 discloses a holder which permits locating the reel in any desired position lengthwise of the cork grip or in any desired position angularly around the grip.

Macy, U.S. Pat. No. 2,780,883 discloses a device which is light in weight, which is non-corrosive, which holds a reel securely and which accommodates the clips or base plates of many spinning reels.

Colmery, U.S. Pat. No. 2,753,646 discloses an improved handle construction for fishing rods having relatively front and rear hand-gripping portions disposed on both sides of a mounted line reel, whereby the handle construction may be grasped and adapted readily to either casting or fly-fishing operations.

Edwards, U.S. Pat. No. 3,073,055 discloses an improved implement handle, but more particularly, is directed toward a handle of a versatile type for economical use by fishermen, the construction being such that it may be effectually used in supporting selectively usable rods, for example, fly rod, boat rod, surf rod, spinning rod or a casting rod, as varying conditions may require.

Binvignat, U.S. Pat. No. 3,310,904, discloses a sheath fitted on that part which constitutes the handle of a fishing-rod, said sheath having a longitudinal aperture the shape and dimensions of which correspond to the shape and dimensions of the fastening sole-plate of a reel, said aperture communicating with a traverse slot extending over an angular spread of about 180°, said slot registering with the position assumed by a lug connecting the body of the reel to the fastening sole-plate thereof.

Arsenault, U.S. Pat. No. 3,410,016 discloses a device removably mounted on the handle of any desired fishing rod and comprising an integral member having a base portion of engagement with the rod handle and a body portion having a particular peripheral and cross sectional configuration, and also having a surface of particular facial contour such that the body portion comfortably supports the user's wrist and forearm or provides a comfortably positioned hand grip for palm and finger encirclement in accordance with a predetermined configuration and contour of the body member.

Kavanagh, U.S. Pat. No. 3,732,644, discloses an improved fishing pole provided with means for selectively mounting a fishing reel at various locations spaced circumferentially and longitudinally along the pole. The pole may be provided with line guide means having eyelets of different sizes and designs circumferentially arranged along the intermediate length of the pole to correspond with the location of the associated reel. A unique tip line guide may be provided which may be stationary or of a swivel nature. The improved fishing rod of the present invention enables a user to employ a single pole with various different types of fishing reels for meeting the needs dictated by the different types of fishing and the different types of terrain encountered during as fishing trip.

McKeown, U.S. Pat. No. 3,975,855, discloses a combination fishing rod which has a plurality of hollow, tubular rod elements telescopically secured into a hollow handle and collapsed substantially completely into the handle for storing. A removable handle and reel seat member is frictionally held onto the handle section of the telescopic rod elements. The removable handle and reel seat are secured to the rod element in one orientation to form a spinning rod and in another orientation to form a fly-casting rod. The removable handle and reel seat element is held to the fishing rod by sliding frictional engagement.

Nakayama et al, U.S. Pat. No. 4,821,447, discloses a fishing rod having a portion on which a leg portion of a fishing reel is mounted, which is composed of a three layered structure integrally formed by a thermosetting manner, and comprising a prepreg sheet or woven fabric layer prepared by impregnating thermosetting resin into high tension or strength fibers, a glass fiber reinforced sheet layer prepared by impregnating thermosetting resin into glass fibers, and a carbon fiber reinforced sheet layer whose fibers extend in a single orientation prepared by impregnating thermosetting resin into carbon fiber. The three layers constitute a thickened portion on which a reel is mounted. Screw threads are formed throughout the entire axial length of the thickened portion and two nut members are screw-engaged with the screw threads in an axially opposing manner to be axially movable. Two movable hoods for mounting the reel are secured by two nut members and the movable hoods are mounted on the thickened portion to be axially movable but not rotatable by engaging it with a groove formed axially in the thickened portion. The screw threads and the groove have a depth reaching the glass fiber reinforced sheet layer.

Atnip, U.S. Pat. No. 6,397,511, discloses an arrangement for adjustably attaching an article, such as a fishing reel, to a rod. The adjustable attachment arrangement of the present invention comprises at least one mounting zone located above and/or below a rod handle and at least one securement arrangement adapted for attaching at least one article to a rod at one of the mounting zones. For each article, a corresponding securement arrangement is adapted to mount the article to the rod at a mounting zone. Each securement arrangement is configured for longitudinal displacement along at least a portion of said mounting zone allowing a user to at least adjust the weight balance and feel of said rod.

Although several of the prior art references depict a manner of mounting a reel upon a rod in an adjustable fashion for the purpose of accommodating various types of fishing techniques (the closest of which appears to be U.S. Pat. No. 6,397,511, to Atnip, which is directed to microadjustability of a reel upon a rod) the prior art fails to teach or suggest a rod and reel system wherein a particular rod's action can be specifically tailored for weight and balance to a plurality of reel types to provide a customizable combination of elements.

SUMMARY OF THE INVENTION

The present invention is directed toward a reel seat kit and method of use wherein reproducible and predictable rod action is achieved via judicious placement of the reel. This is based upon reel type and weight, and upon a rod having a particular inherent action so as to achieve an optimum combination of elements.

Accordingly, it is an objective of the instant invention to provide a system for enabling a reel to be adjustably positioned upon a rod.

It is a further objective of the instant invention to provide a plurality of segmented handgrips positionable about the selected reel position, for providing a desired handgrip service in relation to the reel.

It is yet another objective of the instant invention to provide adjustably positionable reel locks for secure engagement of a reel to a rod in a user selectable location.

It is a still further objective of the invention to teach a kit, for use with a fishing rod blank, for providing a fishing rod having a user adjustable reel seat, user positionable reel locks, and user positionable and formable handgrips.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 1 is a perspective view of a fishing rod incorporating the adjustable reel mounting kit of the present invention;

FIG. 2 is a side view of a fishing rod incorporating the adjustable reel locking kit of the present invention;

FIG. 3 is a cross sectional view of an alternative embodiment of the adjustable reel locking kit.

DETAILED DESCRIPTION OF THE INVENTION

Various types of fishing reels and rods are well-known in the art. When an angler is determining the type of quarry that he/she is desirous of targeting, the first selection that must be made is in regard to the appropriate tackle selection.

Bait-casting, trolling, spinning, fly, these are but a few examples of the myriad types of fishing tackle from which an angler may select. Within each of these categories there are additional selections in terms of reel design, line weight, rod length and material selections.

One of the most vexing problems to any angler is having the right tools available for the job at hand. Indeed, many rods and reels are designed and sold as sets, where a particular rod is "designed" for use with a particular reel. This often causes an angler to purchase, store and transport a plurality of different rod and reel combinations, which are touted as being the most suitable choices for a specific type or style of fishing.

The instant invention provides an alternative which enables a single rod blank to be outfitted with an infinitely adjustable reel seat and locking assembly for positioning a variety of reels upon a single fishing rod, thereby enabling an angler to custom tune a rod/reel combination for the best feel and action possible. By eliminating the need for multiple rod and reel combinations, both the expense and storage space requirements previously necessary for targeting multiple types of aquatic quarry is markedly reduced. In a particular embodiment, the rod is further provided with a plurality of custom fit handgrips, so that the size and position of handgrips can be adjusted by the angler, for a truly individualized system.

Referring now to FIG. 1, a fishing rod blank 10 is illustrated, having positioned thereon the adjustable reel locking kit of the instant invention. The rod blank 10 has a longitudinal axis 12 and a designated mounting area 14 upon which the adjustable reel locking kit of the present invention may be positioned. The adjustable reel mounting kit comprises of a first reel locking assembly 16, a second reel locking assembly 18, a gripping means 30 to be positioned upon the designated mounting area 14, and a reel mounting surface 20. Locking assemblies 16 and 18 may be judiciously positioned along the longitudinal axis 12 of the mounting area 14 for appropriate placement of any reel, such as a bait casting, spinning, trolling or fly reel (not shown). The spacing between locking assemblies 16 and 18 is infinitely adjustable to accommodate any reel configuration. Models intended for fairly light weight combinations may reasonably rely upon frictional engagement of a tapered locking ring 17 with a similarly tapered reel foot (not shown), in order to provide sufficient frictional engagement of the reel to the rod, in order to prevent slippage or free spinning of the reel about the circumferential face of the rod. Additionally, a reel mounting surface 20 having a longitudinal axis and a tubular circumferential surface is be provided for slidable engagement about the fishing rod blank 10, whereby the reel locking assemblies 16 and 18 abut either side of the reel mounting surface 20 (which may be adjustably sized by the user to accommodate a particular reel dimension) so as to provide a user positionable and reinforced reel mounting surface 20. When the reel mounting surface 20 is slidably engaged with the rod blank 10 they share the same longitudinal axis 12.

When a heavier duty connection is needed, it is contemplated to provide reel mounting surface 20 which positively engages the reel in a manner to preclude slippage and circumferential movement of the reel about the rod blank 10. Although numerous embodiments are contemplated for such a reel mounting surface 20, an illustrative, albeit non-limiting embodiment is set forth in FIG. 3, wherein a spring biased detent 22 is illustrated having a mating pin or ball 24 on either or both locking assemblies 16 and 18 is designed to engage at least one of a plurality of pre-drilled indentations 26 longitudinally spaced along the reel mounting surface 20. Furthermore, the circumferential surface on the ends of the reel mounting surface 20 includes threading 21. The spacing of the indentations 26, coupled with the overlap provided by the upper and lower threaded areas 28 and 28' of the reel locks 16 and 18 respectively, cooperate with the threaded ends of the reel mounting surface 20 to enable infinite adjustment of the reel position within the mounting area 14 defined upon the rod blank 10.

Upon having determined the desired position of the locking assemblies 16 and 18, the end user may then calculate the position of the handgrips 30, and the desired length thereof. Selection from one or more of the segmented, nestable handgrip subassemblies 30, and positioning of any desired combination thereof on either side of the locking assemblies 16 and 18, enables the end user to position a custom sized handgrip at any desired location on the rod blank.

The adjustable reel locking kit of the instant invention, including at least a first and second reel locking assembly, a reel mounting surface, and a plurality of segmented nesting handgrip subassemblies, enables a rod manufacturer or end user to construct a single rod which is adaptable to a plurality of reels, and further enables a customizable action to be achieved for each rod and reel assembly.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A universal reel locking and positioning kit for a fishing rod blank comprising:

an elongate reel mounting surface having a longitudinal axis and a circumferential surface, said reel mounting surface adapted for longitudinal slidable engagement with a said fishing rod blank;

first and second reel locking assemblies for removably attaching a fishing reel to said reel mounting surface, said reel locking assemblies constructed and arranged to be adjustably positionable about said longitudinal axis of said reel mounting surface; and a gripping means adjustably positionable longitudinally along said fishing rod blank, wherein said gripping means are constructed and arranged from a plurality of segments each of which are adapted to be slidably engaged about said rod blank, said gripping means being constructed and arranged to abut in a nesting relationship.

2. The kit of claim 1 wherein said elongate reel mounting surface is tubular.

3. The kit of claim 1 wherein said circumferential surface of said elongate reel mounting surface is threaded.

4. The kit of claim 1, wherein said gripping means is selected from the group consisting of cork or polymer foam.

5. The kit of claim 3, wherein said first and second reel locking assemblies threadably engage said circumferential threaded surface of said elongate reel mounting surface.

* * * * *